US009645841B2

(12) United States Patent
Ayanam et al.

(10) Patent No.: US 9,645,841 B2
(45) Date of Patent: May 9, 2017

(54) DYNAMIC VIRTUAL MACHINE STORAGE USAGE MONITORING, PROVISIONING, AND MIGRATION

(71) Applicant: AMERICAN MEGATRENDS, INC., Norcross, GA (US)

(72) Inventors: Varadachari Sudan Ayanam, Suwanee, GA (US); Venkatesaperumal Kondalsamy, Chennai (IN); Santhosh Samuel Mathews, Chennai (IN); Samvinesh Christopher, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 476 days.

(21) Appl. No.: 14/300,964

(22) Filed: Jun. 10, 2014

(65) Prior Publication Data

US 2015/0358404 A1    Dec. 10, 2015

(51) Int. Cl.
*G06F 15/16* (2006.01)
*G06F 9/455* (2006.01)
*G06F 9/48* (2006.01)
*G06F 9/50* (2006.01)

(52) U.S. Cl.
CPC ........ *G06F 9/45558* (2013.01); *G06F 9/4856* (2013.01); *G06F 9/5083* (2013.01); *G06F 2009/4557* (2013.01)

(58) Field of Classification Search
CPC .. G06F 9/45558; G06F 9/485; G06F 9/45533; G06F 2009/45575
See application file for complete search history.

(56) References Cited

U.S. PATENT DOCUMENTS

| 8,738,972 B1* | 5/2014 | Bakman | G06F 11/0712 714/47.1 |
| 2013/0013865 A1* | 1/2013 | Venkatesh | G06F 17/30132 711/133 |
| 2013/0111033 A1* | 5/2013 | Mao | G06F 9/5072 709/226 |
| 2013/0138863 A1* | 5/2013 | Tsirkin | G06F 12/0284 711/6 |
| 2013/0275970 A1* | 10/2013 | Heim | G06F 11/3072 718/1 |

* cited by examiner

*Primary Examiner* — Viet Vu
(74) *Attorney, Agent, or Firm* — Locke Lord LLP; Tim Tingkang Xia, Esq.

(57) ABSTRACT

An intelligent virtual desktop infrastructure (iVDI) system is described. The system includes a first storage module having a processor, in communication with a hypervisor, and implemented by a volatile memory. The first storage module supplies a plurality of virtual machine operating systems (VMOSs) to the hypervisor. The hypervisor runs virtual machine (VMs) corresponding to the VMOSs. The systems also includes a VMOS management module configured to execute a first determination operation to determine if a usage of the first storage module has reached a preset storage limit. If yes, the VMOS management module selectively (a) initiate a deduplication operation directed to the plurality of VMOSs stored in the first storage module and (b) initiate a removal operation including removing at least one of the VMOSs from the first storage module and/or turning off at least one of the VMs running on the hypervisor.

30 Claims, 7 Drawing Sheets

DYNAMIC VIRTUAL MACHINE STORAGE USAGE MONITORING, PROVISIONING, AND MIGRATION

FIELD

The present disclosure relates generally to virtual desktop infrastructure (VDI) technology, and particularly to high performance intelligent VDI (iVDI) using volatile memory for storing virtual machine operating systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Virtual desktop infrastructure (VDI) is a desktop-centric service that hosts user desktop environments on remote servers or personal computers, which are accessed over a network using a remote display protocol. Typically, VDI uses disk storage for storing the virtual machine (VM) images, user profiles, and other information for the end users to access. However, when simultaneous access of the VMs are needed, data access to the multiple VM images from the disk storage may be too slow. Particularly, the VDI service may degrade when a significant number of end users boot up within a very narrow time frame and overwhelm the network with data requests (generally referred to as bootstorm). The occurrence of bootstorm creates a bottleneck for the VDI service.

Therefore, an unaddressed need exists in the art to address the aforementioned deficiencies and inadequacies.

SUMMARY

Certain aspects of the present disclosure are directed to an intelligent virtual desktop infrastructure (iVDI) system. The system includes a first storage module having a processor, in communication with a hypervisor, and implemented by a volatile memory. The first storage module supplies a plurality of virtual machine operating systems (VMOSs) to the hypervisor. The hypervisor runs a plurality of virtual machine (VMs) corresponding to the plurality of VMOSs. The system includes a VMOS management module that can execute a first determination operation to determine if a usage of the first storage module has reached a preset storage limit. In response to a determination that the usage of the first storage module has reached the preset limit, the VMOS management module can selectively (a) initiate a deduplication operation directed to the plurality of VMOSs stored in the first storage module and (b) initiate a removal operation including at least one of removing at least one of the plurality of VMOSs from the first storage module and turning off at least one of the plurality of VMs running on the hypervisor.

In certain embodiments, the VMOS management module can periodically execute the first determination operation at a predetermined time interval. In certain embodiments, the VMOS management module can execute a second determination operation to determine if a usage of the processor has reached a preset processor limit.

In certain embodiments, the VMOS management module can, in response to the second determination that the usage of the processor has reached a preset processor limit, execute a third determination operation to determine if a predetermined time period has passed since a previous deduplication operation, and, in response to determining that the predetermined time period has passed, initiate the deduplication operation.

In certain embodiments, the VMOS management module can, in response to the second determination that the usage of the processor has reached a preset processor limit, execute a third determination operation to determine if a predetermined time period has passed since a previous deduplication operation, and, in response to determining that the predetermined time period has not passed, initiate the removal operation.

In certain embodiments, the VMOS management module can, in the removal operation, determine if a first VM of the plurality of VMs is not used at the hypervisor, and, in response to determining that the first VM is not used at the hypervisor, turn off the first VM at the hypervisor.

In certain embodiments, the system includes a second storage module in communication with the VMOS management module and implemented by a non-volatile memory. The VMOS management module is configured to, in the removal operation, in response to determining that the first VM is not used at the hypervisor, remove a first VMOS corresponding to the first VM from the first storage module and store the first VMOS in the second storage module.

In certain embodiments, the VMOS management module can determine if the first VM is a pooled VM, and, in response to a determination that the first VM is a pooled VM, store a current state of the first VM and turn off the first VM. In certain embodiments, the VMOS management module can, in response to a determination that the first VM is not a pool VM, determine if another hypervisor having resources is available. The VMOS management module can, in response to a determination that the another hypervisor is available, migrate the first VM to the another hypervisor, and otherwise, store a current state of the first VM and turns off the first VM.

In certain embodiments, the management module can, in the removal operation, select at least one second VM of the plurality of VMs in accordance with a predetermined set of rules, and selectively turn off the at least one second VM and remove a VMOS corresponding to the at least one second VM from the first storage module. In certain embodiments, the management module can select the at least one second VM from pooled VMs of the plurality of VMs based on a usage comparison of the pooled VMs and notify at least one user of the at least one second VM unavailability of the at least one second VM. In certain embodiments, the at least one second VM is a collection of pooled VMs.

In certain embodiments, the management module can select the at least one second VM from personalized VMs of the plurality of VMs based on a usage comparison of the personalized VMs and notify at least one user of the at least one second VM unavailability of the second VMOS. In certain embodiments, the at least one second VM is a collection of personalized VMs.

Certain aspects of the present disclosure are directed to a method for use with an intelligent virtual desktop infrastructure (iVDI) system. The iVDI system includes a first storage module having a processor, in communication with a hypervisor, and implemented by a volatile memory. The first storage module supplies a plurality of virtual machine operating systems (VMOSs) to the hypervisor. The hypervisor runs a plurality of virtual machine (VMs) corresponding to the plurality of VMOSs. The method includes executing, at a VMOS management module, a first determination operation to determine if a usage of the first storage module has reached a preset storage limit, and in response to a determination that the usage of the first storage module has reached the preset limit, selectively (a) initiating a deduplication operation directed to the plurality of VMOSs stored in the first storage module and (b) initiating a removal operation including at least one of removing at least one of the plurality of VMOSs from the first storage module and turning off at least one of the plurality of VMs running on the hypervisor.

Certain aspect of the present disclosure are directed to a non-transitory computer readable medium storing computer executable instructions for use with an intelligent virtual desktop infrastructure (iVDI) system including a first storage module having a processor, in communication with a hypervisor, and implemented by a volatile memory, wherein the first storage module supplies a plurality of virtual machine operating systems (VMOSs) to the hypervisor, wherein the hypervisor runs a plurality of virtual machine (VMs) corresponding to the plurality of VMOSs, the instructions comprising: executing, at a VMOS management module, a first determination operation to determine if a usage of the first storage module has reached a preset storage limit, and in response to a determination that the usage of the first storage module has reached the preset limit, selectively (a) initiating a deduplication operation directed to the plurality of VMOSs stored in the first storage module and (b) initiating a removal operation including at least one of removing at least one of the plurality of VMOSs from the first storage module and turning off at least one of the plurality of VMs running on the hypervisor.

BRIEF DESCRIPTION OF THE DRAWINGS

The present disclosure will become more fully understood from the detailed description and the accompanying drawings, wherein.

DETAILED DESCRIPTION

Figure 1:
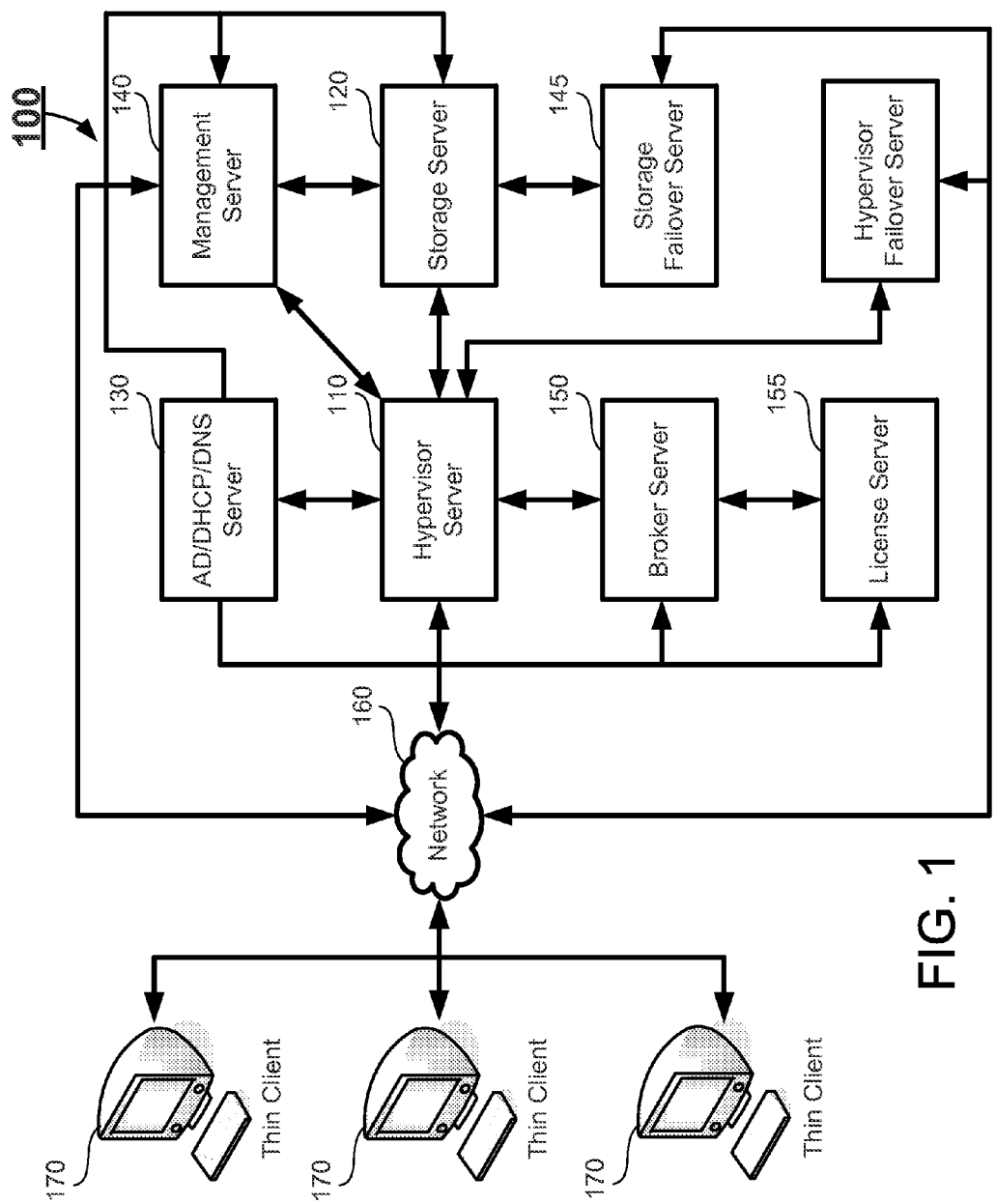
FIG. 1 schematically depicts an iVDI system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or VMOSs. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "server" generally refers to a system that responds to requests across a computer network to provide, or help to provide, a network service. An implementation of the server may include software and suitable computer hardware. A server may run on a computing device or a network computer. In some cases, a computer may provide several services and have multiple servers running.

As used herein, the term "hypervisor" generally refers to a piece of computer software, firmware or hardware that creates and runs virtual machines. The hypervisor is sometimes referred to as a virtual machine manager (VMM).

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As such, one of skill in the art will appreciate that these logical operations may be stored on any type of computer readable medium, which may also be referred to as a "computer program product." Exemplary forms of computer readable media include computer storage media and communications media. Computer storage media includes volatile and nonvolatile, removable and non-removable media implemented in any method or technology for storage of information such as computer readable instructions, data structures, program modules or other data. As such, exemplary forms of computer storage media includes, without limitation, read only and random access memory (ROM and RAM, respectively), solid state, non-volatile memory, EEPROM, flash memory or other memory technology, magnetic tape, magnetic cassettes, magnetic disk storage, magnetic disc media or other magnetic storage devices, DVD or other optical storage, and CD-ROM. Communications media includes a modulated data signal, such as, but not limited to, a carrier wave or other transport mechanism, propagating on a carrier. A modulated data signal refers to a signal that encodes information. Exemplary forms of a carrier for communications media include, without limitation, any type of wired network and/or wireless media, such as acoustic, radio frequency, infrared and other wireless media.

It will be appreciated that the acts and symbolically represented operations include the manipulations by a CPU of electrical signals representing data bits causing a transformation or reduction of the electrical signal representation, and the maintenance of data bits at memory locations in memory, solid state, non-volatile memory, CD-ROM or any other type of storage unit (e.g., disc drive, tape drive, etc.) to thereby reconfigure or otherwise alter the operation of the computing system implementing the configuration execution module 114, as well as other processing signals. As such, performance of these operations is referred to as being "computer executed." The memory locations where data bits are maintained are physical locations that have particular electrical, magnetic, or optical properties corresponding to the data bits According to certain embodiments of the present disclosure, the entire virtual machine operating systems (VMOSs) are made available in a memory (e.g., RAM) storage to cater to remote users. This can offer incredible performance that allows virtual machines (VMs) to scale. A deduplication operation can be employed to compresses the VMOSs on the memory storage. This may offer 80-90% reduction in storage. This further enables populating more VMs (dense) within a limited storage. The deduplication operation is not a one-time process; it needs to be performed on a continuous basis as the VMOS data may inflate based on their usage. The deduplication operation reduces the number of VMs that can be run. Storage utilization can be monitored and provisioned intelligently and efficiently, such that users' business continuity and productivity are not affected.

FIG. 1 schematically depicts an iVDI system 100 according to certain embodiments of the present disclosure. As shown in FIG. 1, the system 100 includes a hypervisor server 110 and a storage server 120. In certain embodiments, the system 100 further includes an active directory (AD)/dynamic host configuration protocol (DHCP)/domain name system (DNS) server 130, a management server 140, a failover server 145, a broker server 150, and a license server 155. A plurality of thin client computers 170 is connected to the hypervisor server 110 via a network 160. The system 100 adopts the virtual desktop infrastructure, and can be a system that incorporates more than one interconnected system, such as a client-server network. The network 130 may be a wired or wireless network, and may be of various forms such as a local area network (LAN) or wide area network (WAN) including the Internet.

The hypervisor server 110 is a computing device serving as a host server for the system, providing a hypervisor for running VM instances. In certain embodiments, the hypervisor server 110 may be a general purpose computer server system or a headless server.

Figure 2A:
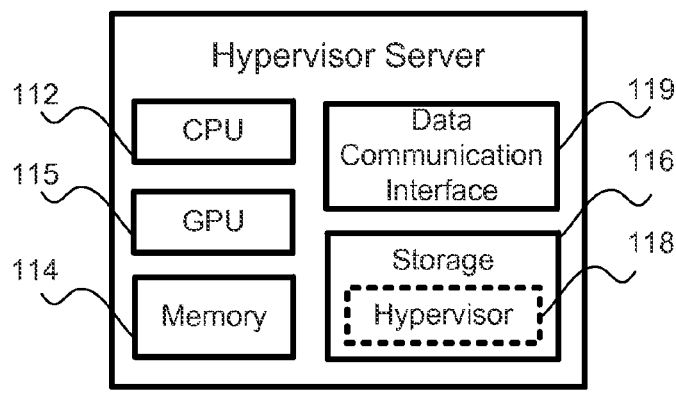
FIG. 2A schematically depicts a hypervisor server of the system according to certain embodiments of the present disclosure.

FIG. 2A schematically depicts a hypervisor server of the system according to certain embodiments of the present disclosure. As shown in FIG. 2A, the hypervisor server 110 includes a central processing unit (CPU) 112, a memory 114, a graphic processing unit (GPU) 115, a storage 116, a server message block (SMB) interface 119, and other required memory, interfaces and Input/Output (I/O) modules (not shown). A hypervisor 118 is stored in the storage 116.

The CPU 112 is a host processor which is configured to control operation of the hypervisor server 110. The CPU 112 can execute the hypervisor 118 or other applications of the hypervisor server 110. In certain embodiments, the hypervisor server 110 may run on more than one CPU as the host processor, such as two CPUs, four CPUs, eight CPUs, or any suitable number of CPUs.

The memory 114 can be a volatile memory, such as the random-access memory (RAM), for storing the data and information during the operation of the hypervisor server 110.

The GPU 115 is a specialized electronic circuit designed to rapidly manipulate and alter the memory 114 to accelerate the creation of images in a frame buffer intended for output to a display. In certain embodiments, the GPU 115 is very efficient at manipulating computer graphics, and the highly parallel structure of the GPU 115 makes it more effective than the general-purpose CPU 112 for algorithms where processing of large blocks of data is done in parallel. Acceleration by the GPU 115 can provide high fidelity and performance enhancements. In certain embodiments, the hypervisor server 110 may have more than one GPU to enhance acceleration.

The storage 116 is a non-volatile data storage media for storing the hypervisor 118 and other applications of the host computer 110. Examples of the storage 116 may include flash memory, memory cards, USB drives, hard drives, floppy disks, optical drives, or any other types of data storage devices.

The hypervisor 118 is a program that allows multiple VM instances to run simultaneously and share a single hardware host, such as the hypervisor server 110. The hypervisor 118, when executed at the CPU 112, implements hardware virtualization techniques and allows one or more operating systems or other applications to run concurrently as guests of one or more virtual machines on the host server (i.e. the hypervisor server 110). For example, a plurality of users, each from one of the thin clients 170, may attempt to run operating systems in the iVDI system 100. The hypervisor 118 allows each user to run an operating system instance as a VM. In certain embodiments, the hypervisor 118 can be of various types and designs, such as MICROSOFT HYPER-V, XEN, VMWARE ESX, or other types of hypervisors suitable for the iVDI system 100.

Figure 2B:
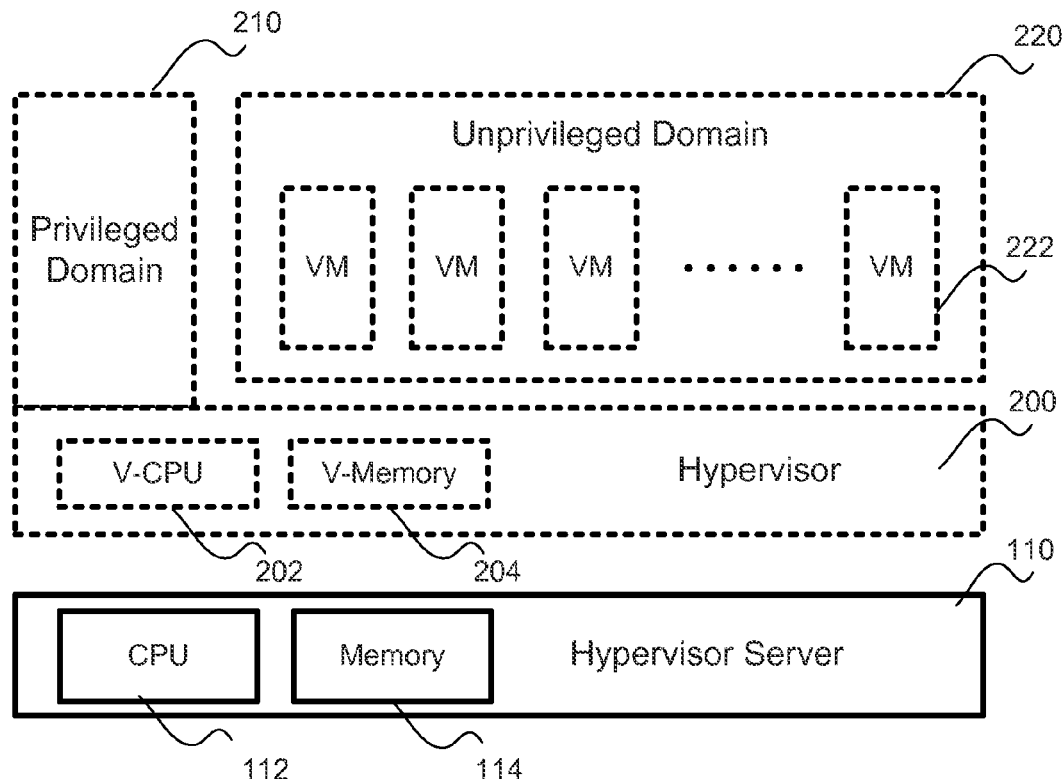
FIG. 2B schematically depicts the execution of the VMs on the system according to certain embodiments of the present disclosure.

FIG. 2B schematically depicts the execution of the VMs on the system according to certain embodiments of the present disclosure. As shown in FIG. 2B, when the hypervisor instance 200 runs on the hypervisor server 110, the hypervisor 200 emulates one or more virtual computer machine, including a virtual CPU 202 and a virtual memory 204. In certain embodiments, the hypervisor 200 can have a privileged domain 210 and an unprivileged domain 220. One or more VMs 222 can operate in the unprivileged domain 220 of the hypervisor 200. Each VM 222 can run a virtual machine operation system (VMOS), such as WINDOWS or LINUX. For brevity, unless otherwise noted, a VM and the VMOS run in that VM are collectively referred to as a VM (such as each VM 222 shown in FIG. 2B).

The hypervisor server 110 can communicate data with the storage server 120 through a data communication interface 119. The data communication interface 119 can implement a storage protocol, a file sharing protocol, or other data transfer protocol. For example, in certain embodiments, the data communication interface 119 can be an Internet Small Computer System Interface (iSCSI) interface. In certain embodiments, the data communication interface 119 can be a Server Message Block (SMB) interface. The SMB protocol is an implementation of a common internet file system (CIFS), which operates as an application-layer network protocol. The SMB protocol is mainly used for providing shared access to files, printers, serial ports, and miscellaneous communications between nodes on a network. Generally, SMB works through a client-server approach, where a client makes specific requests and the server responds accordingly. In certain embodiments, one section of the SMB protocol specifically deals with access to file systems, such that clients may make requests to a file server. In certain embodiments, some other sections of the SMB protocol specialize in inter-process communication (IPC). The IPC share, sometimes referred to as ipc$, is a virtual network share used to facilitate communication between processes and computers over SMB, often to exchange data between computers that have been authenticated. SMB servers make their file systems and other resources available to clients on the network.

In certain embodiments, the hypervisor server 110 and the storage server 120 are connected under the SMB 3.0 protocol. The SMB 3.0 includes a plurality of enhanced functionalities compared to the previous versions, such as the SMB Multichannel function, which allows multiple connections per SMB session, and the SMB Direct Protocol function, which allows SMB over remote direct memory access (RDMA), such that one server may directly access the memory of another computer through SMB without involving either ones operating systems. Thus, the hypervisor server 110 may request for the files or data stored in the storage server 120 via the SMB interface 119 through the SMB protocol. For example, the hypervisor server 110 may request for the VMOSs and user profiles from the storage server 120 via the SMB interface 119. When the storage server 120 sends the requested VMOSs and user profiles, the hypervisor server 110 receives the VMOSs and user profiles via the SMB interface 119 such that the hypervisor 200 can execute the VMOSs in the VMs 222.

Figure 3:
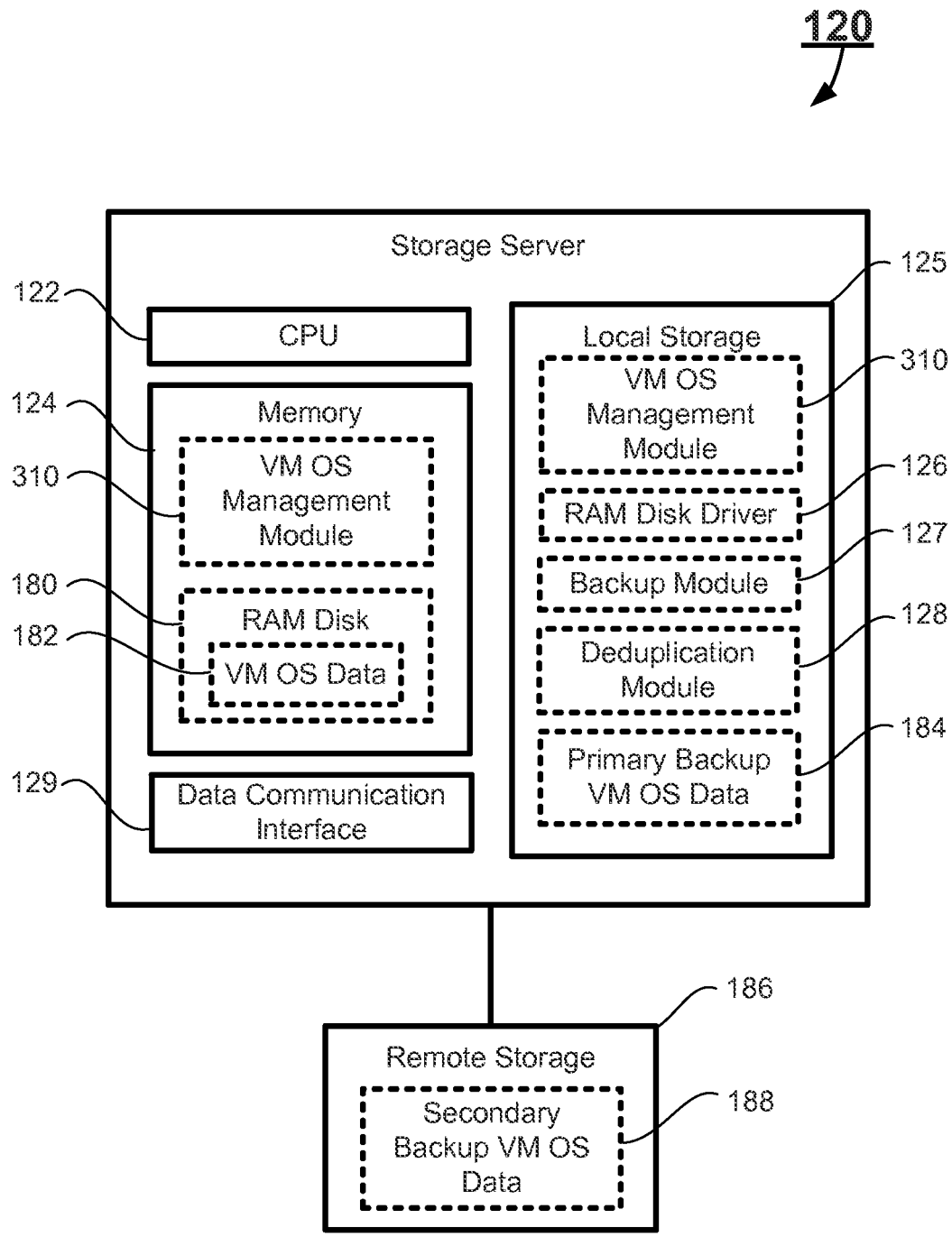
FIG. 3 schematically depicts a storage server according to certain embodiments of the present disclosure.

FIG. 3 schematically depicts a storage server according to certain embodiments of the present disclosure. The storage server 120 is a computing device providing storage functionality of the system 110. The storage server 120 includes a CPU 122, a memory 124, a local storage 125, a SMB interface 129, and other required memory, interfaces and Input/Output (I/O) modules (not shown). Further, a remote storage 186 is connected to the storage server 120. The local storage 125 stores a RAM disk driver 126, a backup module 127, a deduplication module 128, and primary backup VM image data 184. The remote storage 186 stores secondary backup VM image data 184. When the storage server 120 is in operation, a RAM disk 180 is created in the memory 124, and the RAM disk 180 stores VM image data 182.

The CPU 122 is a host processor which is configured to control operation of the storage server 120. The CPU 122 can execute an operating system or other applications of the storage server 120, such as the RAM disk driver 126, the backup module 127, and the deduplication module 128. In certain embodiments, the storage server 120 may run on or more than one CPU as the host processor, such as two CPUs, four CPUs, eight CPUs, or any suitable number of CPUs.

The memory 124 is a volatile memory, such as the RAM, for storing the data and information during the operation of the storage server 120. When the storage server 120 is powered off, the data or information in the memory 124 may be lost.

In certain embodiments, when the storage server 120 is in operation, certain areas of the memory 124 can be configured as a RAM disk 180, while other programs, modules, and data are loaded into other areas of the memory 124 for operating of the storage server 120.

In certain embodiments, the iVDI system 100 further includes a VMOS management module 310. In the example shown in FIG. 3, the VMOS management module 310 is installed on the storage server 120. In certain embodiments, the VMOS management module 310 can be a software module that is stored in the local storage 125 and loaded into the memory 124 for execution by the CPU 122. The VMOS management module 310 generally manages the VMOSs stored in the RAM disk 180. In certain embodiments, the VMOS management module 310 can be a hardware module that similarly manages the VMOSs stored in the RAM disk 180.

The VMOS management module 310 can determine whether the volume of VMOSs stored in the RAM disk 180 has reached to a preset storage limit. The preset storage limit can specify a storage size or a percentage of the total storage size of the RAM disk 180. For example, if the size of the RAM disk 180 is 1024 gigabytes, the preset storage limit can be either 820 gigabytes or 80%. Once the VMOS management module 310 has determined that the VMOSs stored in the RAM disk 180 have reached the preset storage limit, it can instruct the RAM disk 180 to perform one or more operations (such as a deduplication operation or a VMOS removal operation, which will be further described below, to reduce the volume of the RAM disk 180 used by the VMOSs.

The VMOS management module 310 can use the RAM disk driver 126 to communicate or operate the RAM disk 180. Alternatively, the VMOS management module 310 can communicate with the RAM disk 180 through a communication interface provided by the RAM disk 180. In certain embodiments, the communication interface can support one or more storage protocols, file sharing protocols, or other data transfer protocols. Through communication, the VMOS management module 310 can query the RAM disk 180 regarding the storage information of the VMOS data 182. Therefore, the VMOS management module 310 can obtain the volume of the VMOS data 182 and storage size of the RAM disk 180. The VMOS management module 310 can further determine whether the volume of the VMOS data 182 has reached the preset storage limit.

In certain embodiments, the VMOS management module 310 can be re-configured by a system administrator. For example, various operational parameters (such as the preset storage limit) of the VMOS management module 310 can be stored in a configuration file, which in turn can be stored in a location known by the VMOS management module 310. At initiation, and optionally periodically thereafter, the VMOS management module 310 can check the configuration file to load the configuration parameters and accordingly configure its operations.

In certain embodiments, the VMOS management module 310 can provide a user interface (UI) to the user, and the user can configure various parameters of the VMOS management module 310 through the UI. The UI can be a graphic UI or a command line UI.

In certain embodiments, the VMOS management module 310 can also determine a usage or performance of the CPU 122. Note that although for clarity only one CPU 122 is illustrated in FIG. 3, the storage server 120 can employ other number of CPUs (e.g., four CPUs or eight CPUs) as well. The VMOS management module 310 can further determine the usage of the resources of all the CPUs. In certain embodiments, each CPU 122 is configured to respond with usage data upon receiving a request. The VMOS management module 310, executed on the CPU 122, can instruct the CPU 122 to query itself to obtain the CPU usage data. In certain embodiments, the RAM disk 180, or a kernel on which the RAM disk 180 is running, allocates the resources of the CPU 122. The VMOS management module 310 can accordingly query the RAM disk 180 or the kernel to obtain the CPU usage data. In certain embodiments, a CPU usage module (not shown) can be utilized to monitor the CPU usage, and accordingly the VMOS management module 310 can query the CPU usage module to obtain the CPU usage data.

In certain embodiments, the VMOS management module 310 is configured with a preset CPU usage limit. For example, the usage limit can be 75% of all combined resources of the one or more CPUs 122. The VMOS management module 310 can be configured to perform different operations to reduce the volume of the RAM disk 180 used by the VMOSs depending on whether the actual CPU usage is lower or higher than the preset CPU usage limit.

In certain embodiments, the RAM disk 180 can be configured at the memory 114 of hypervisor server 110, instead of the memory 124 of the storage server 120. In other words, the hypervisor server 110 uses a part of its own memory 114 as a RAM disk 180. Accordingly, the VMOS management module 310 can be installed on the hypervisor server 110.

Figure 4A:
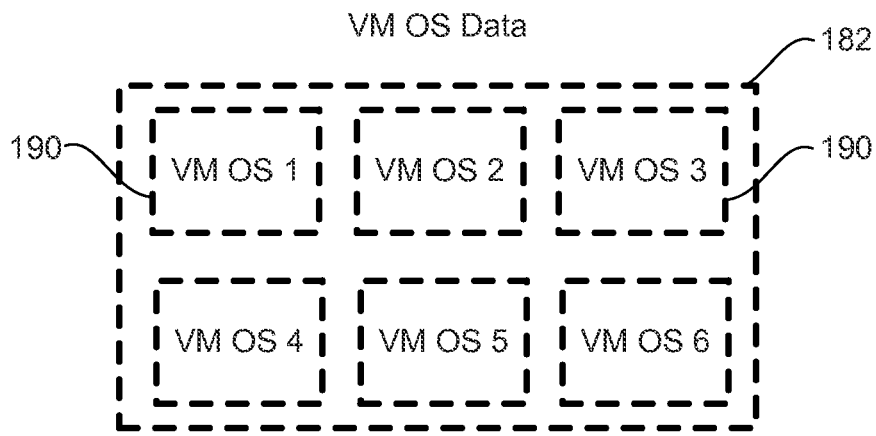
FIG. 4A schematically depicts the VM image data before deduplication according to certain embodiments of the present disclosure.
Figure 4B:
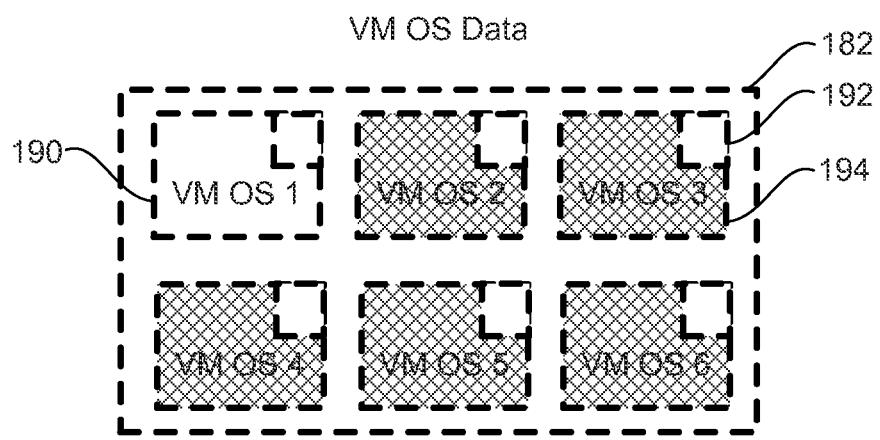
FIG. 4B schematically depicts the VM image data during deduplication according to certain embodiments of the present disclosure.
Figure 4C:
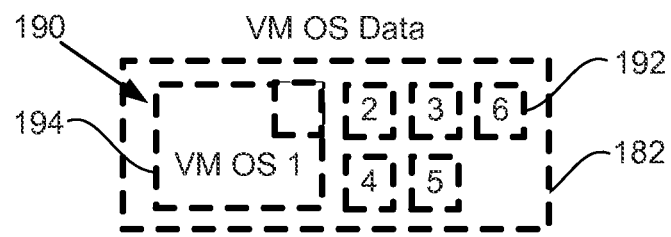
FIG. 4C schematically depicts the VM image data after deduplication according to certain embodiments of the present disclosure.

FIGS. 4A to 4C schematically depict an example of the deduplication operation of the VMOS data according to certain embodiments of the present disclosure. In this simplified example, as shown in FIG. 4A, the VMOS data 182 stored in the RAM disk 180 include six VMOSs 190 (respectively labeled VMOSs 1-6). Note that in actual use, the RAM disk 180 typically can store many more VMOSs (e.g., hundreds VMOSs) than those shown in this simplified example. In certain embodiments, each VMOS 190 can be an operating system image for a user of the system 100. Since each user may have a different user profile, each VMOS 190 includes the user profile data, which is different from the user profile data of other VMOSs 190. The rest of the data chunks of the VMOSs 190 can include the same data (such as system data), which is repeated over and over again in the VMOSs 190. For example, if all the VMOSs 1-6 are the same Linux operating system, then most of the Linux system data of the six VMOSs 190 are the same. The difference between two VMOSs 190 would likely be user data, configuration data, customization data, etc.

As shown in FIG. 4A, before the deduplication process, each VMOS 190 is an uncompressed image, and the size of the VMOS data 182 can be large due to the existence of all VMOSs 190. When deduplication starts, the VMOSs 190 are identified and analyzed in comparison with each other. For example, each of the VMOSs 2-6 will be compared with a reference VMOS 190 (e.g., the VMOS 1). As shown in FIG. 4B, the unique data chunks 192 and other repeat and redundant data chunks 194 for each VMOS 190 will be identified such that the repeat and redundant data chunks 194 can be replaced with a reference, such as a pointer, that points to the stored chunk of the reference VMOS 1. Once the deduplication analysis is complete, the repeat and redundant data chunks 194 can be removed to release the memory space of the RAM disk 180 occupied by the repeat and redundant data chunks 194. As shown in FIG. 4C, the VMOS data 182 after deduplication includes only one full reference VMOS (the VMOS 1) 190, which includes both the unique data chunks 192 and the base data chunk 194 (which is the same for each VMOS 190), and five unique data chunks or fragments of VMOSs (2-6) 192. Thus, the size of the VMOS data 182 can be greatly reduced, allowing the RAM disk 180 to store additional VMOSs 190 with further deduplication processes.

In this example, the hypervisor server 110 lunches six VMs 222, and each VM 222 loads and operates one VMOSs 190 for use by a user. During use, needed data of each VMOS 190 are assembled by the RAM disk 180 from the base data chunk 194 and respective unique data chunk 192 and then provided to the hypervisor server 110. Each VM 222 during operation at the hypervisor server 110 can send system data and user data back to the RAM disk 180, which stores the received data of each VM 222 separately. The received data of one VM 222 now may again have the same (or redundant) data as those of another VM 222. Therefore, the above described deduplication operation can be executed again to reduce data redundancy.

In certain embodiments, the VMOS management module 310 can be configured to run a deduplication operation in accordance of a preset of rules. For example, the rules can specify the conditions for running a deduplication operation. The conditions can include one or more of: that the usage of the RAM disk 180 has reached a preset storage limit, that the usage of the CPU 122 has not reached a preset processor usage limit, and that a predetermined time period has passed since a previous deduplication operation.

Each time the VMOS management module 310 performs a deduplication operation, the VMOS management module 310 can save a time stamp to specify the time at which the deduplication operation was performed. In certain embodiments, when the VMOS management module 310 determines that there is a need to reduce the volume of the VMOS data 182, the VMOS management module 310 can consider to run a deduplication operation again. The VMOS management module 310 can be configured to run another deduplication operation only after a preset time period has passed. For example, the preset time period can be 30 minutes, one hour, two hours, or 24 hours. This parameter about preset time period of the VMOS management module 310 can be configured by a user, for example, through the configuration file or UI discussed above.

Figure 5:
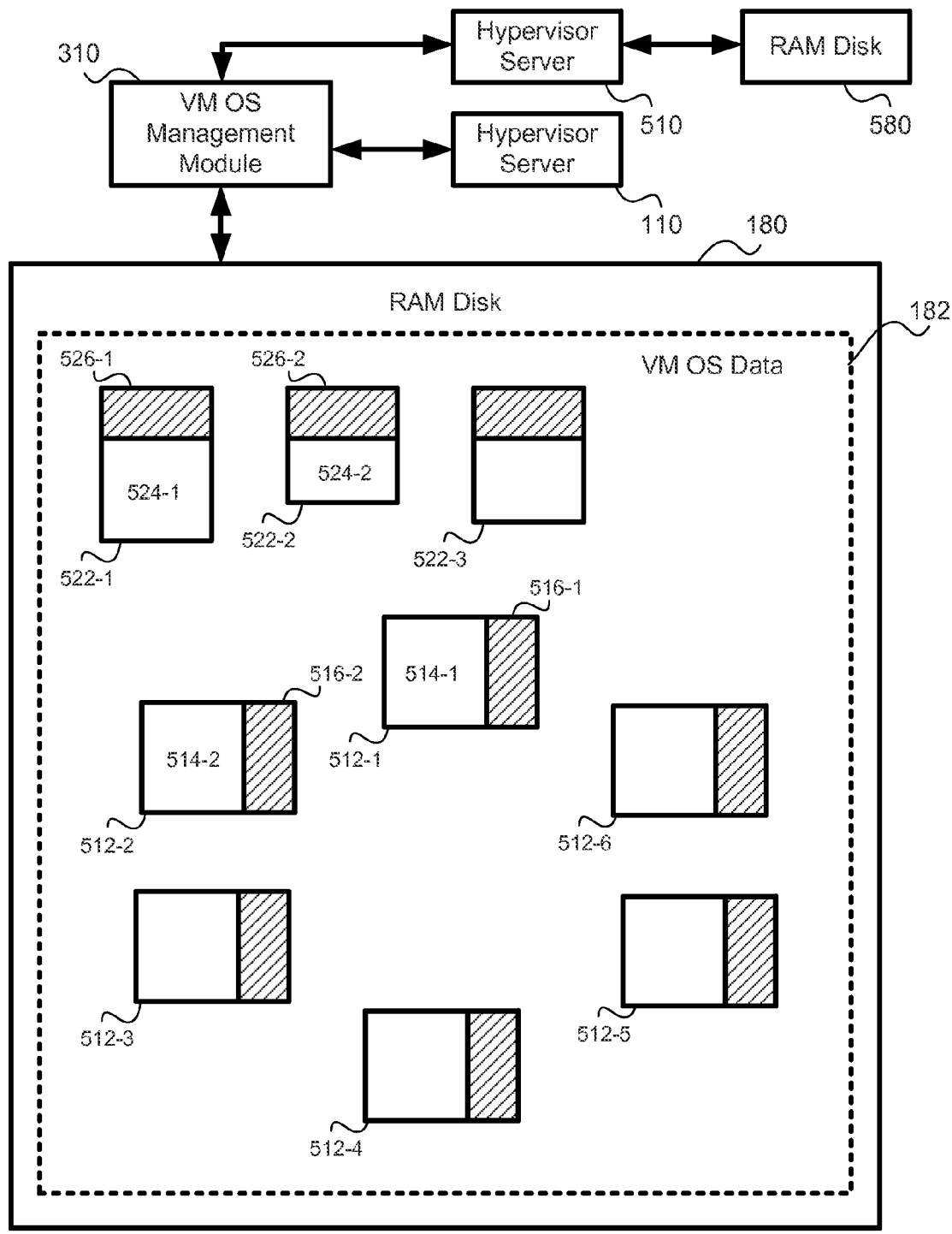
FIG. 5 schematically illustrates data structure of the VMOS data according to certain embodiments of the present disclosure.

FIG. 5 schematically illustrates data structure of the VMOS data 182 according to certain embodiments of the present disclosure. As shown, the VMOS data 182 have a collection of pooled VMOSs 512. Typically the pooled VMOSs 512 in the collection are made from the same VMOS template and thus have the same system configuration. For example, the pooled VMOSs 512 can be configured to operate VMs having the same configuration (i.e., virtual CPU and virtual memory). The system data and configuration 514 of the pooled VMOSs 512 typically are identical to each other. The pooled VMOSs 512 can have the same operating system, same programs and applications, and same file system and storage structure. Each pooled VMOS 512 can have individual user data and configuration 516 that are specific to a user. In other words, the individual user data and configuration 516-1 of the pooled VMOS 512-1 can be different from the individual user data and configuration 516-2 of the pooled VMOS 512-2. A user can be allocated a different pooled VMOS 512 each time a user is in need of a VMOS. The individual user data and configuration 516 of that user will be assembled with a pooled VMOS 512 dynamically allocated to the user at the time.

In certain embodiments, the VMOS data 182 can also have personalized VMOSs 522. Contrary to the pooled VMOSs 512, the personalized VMOSs 522 typically are not made from the same VMOS template. Each personalized VMOS 522 is personalized for the user using that personalized VMOS 522. Therefore, the personalized system data and configuration 524-1 of the personalized VMOS 522-1 typically are different from the personalized system data and configuration 524-2 of the personalized VMOS 522-2. Each personalized VMOS 522 can have a different OS, different programs and applications, and a different file system and storage structure, comparing to another personalized VMOS 522. The personalized user data and configuration 526 of a personalized VMOS 522 typically are also different from those of another personalized VMOS 522.

In certain embodiments, the hypervisor server 110 runs one or more VMs 222 corresponding to one or more of the VMOSs 512, 522 stored in the RAM disk 180. The VMs 222 includes personalized VMs 222 and pooled VMs 222.

In certain embodiments, the VMOS management module 310 can detect the VMs 222 that are not used by users but still running on the hypervisor server 110. Particularly, an exemplary unused VM 222 is a VM that has been started but currently is just spinning off cycles without real use; no user session is connected to the unused VM 222. In certain embodiments, the hypervisor server 110 can keep reference of all the VMs 222 and corresponding VMOS that are not used by any user at the hypervisor server 110. Further, the VMOS management module 310 can communicate with the hypervisor server 110 and the RAM disk 180 to inquire about whether a particular VMOS is used at the hypervisor server 110 or to obtain a list of unused VMOSs.

In certain embodiments, the VMOS management module 310 can query the hypervisor server 110 to obtain usage information of each VM 222 running on the hypervisor server 110. The VMOS management module 310 can accordingly determine usage frequency orders of the corresponding pooled VMOSs 512 and personalized VMOSs 522. For example, the VMOS management module 310 knows which pooled VMOS 512 is the least used pooled VMOS 512 and which personalized VMOS 522 is the least used personalized VMOS 522, etc.

In certain embodiments, although not shown in FIGS. 4-5, the hypervisor server 110 can run more than one collection of pooled VMs 222 and the RAM disk 180 can have more than one collection of corresponding pooled VMOSs 512. Similarly, the hypervisor server 110 can run more than one collection of personalized VMs and the RAM disk 180 can have more than one collection of corresponding pooled VMOSs 512.

In certain embodiments, the VMOS management module 310 can query the hypervisor server 110 to obtain usage information of each collection of VMs 222 running on the hypervisor server 110. The VMOS management module 310 can accordingly determine usage frequency orders of the collections of pooled VMOSs 512 and personalized VMOSs

522. For example, the VMOS management module 310 knows which collection of pooled VMOSs 512 is the least used collection of pooled VMOSs 512 and which collection of personalized VMOSs 522 is the least used collection of personalized VMOSs 522, etc.

In certain embodiments, the VMOS management module 310 can initially turn off one or more of the VMs 222 and, when needed, further remove corresponding VMOSs from the RAM disk 180. An unused VM 222 is still running on the hypervisor server 110, but has no user session connected to it. Nonetheless, the unused VM 222 takes resources of the CPU 112 and, especially, the memory 114 of the hypervisor server 110. The VMOS management module 310 can instruct the hypervisor server 110 to turn off, i.e., stop running a particular VM 222 and remove the VM 222 from the unprivileged domain 220 of the hypervisor 200. When a VM 222 is turned off, the memory space occupied by the VM 222 in the memory 114 accordingly is released. This can be beneficial to the iVDI system 100. Especially, when the RAM disk 180 is made in the same memory 114 of the hypervisor server 110 (not in the memory 124 of the storage server 120), the released memory space, which was previously occupied by the unused VM 222, can be then utilized by the RAM disk 180 for storing pooled VMOSs 512 and personalized VMOSs 522, thus relieving the stress of the memory 114.

The VMOS management module 310 can also further proceed to remove VMOSs from the RAM disk 180, in order to free memory space occupied by VMOSs. The VMOS management module 310 can determine first if any of the pooled VMOSs 512 and personalized VMOSs 522, based on the corresponding VMs 222, are not used by the hypervisor server 110. An unused VMOS can be either a pooled VMOS 512 or a personalized VMOS 522. The RAM disk 180 may have more than one VMOSs that are not used by the hypervisor server 110. The VMOS management module 310 can be configured to have a set of rules or preferences for turning off the VMs 222 and/or removing the VMOSs from the RAM disk 180. For example, the rules can specify that the VMOS management module 310 should remove unused pooled VMs 222 and VMOSs 512 first then remove the unused personalized VMs 222 and VMOSs 522. The rules can also specify that the VMOS management module 310 should remove the unused VM and VMOS having the largest size.

The VMOS management module 310 can decide to remove an unused pooled VMOS 512 from the RAM disk 180. For example, if the pooled VMOS 512-1 is not used, the VMOS management module 310 can first request the hypervisor server 110 to turn off the corresponding VM 222 at the hypervisor server 110. Then, the VMOS management module 310 can request the RAM disk 180 to save the current state of the pooled VMOS 512-1 and then remove (or discards) the pooled VMOS 512-1 from the RAM disk 180. The RAM disk 180 accordingly saves the state of the pooled VMOS 512-1 and removes (or discard) the pooled VMOS 512-1 from the RAM disk 180. If the pooled VMOS 512-1 has individual user data and configuration 516-1, the VMOS management module 310 can also instruct the RAM disk 180 to save the individual user data and configuration 516-1 before removing the pooled VMOS 512-1 from the RAM disk 180. In certain embodiments, the RAM disk 180 can save the state and the individual user data and configuration 516-1 of the pooled VMOS 512-1 to a specific location of the RAM disk 180. In certain embodiments, the RAM disk 180 can save the state and the individual user data and configuration 516-1 of the pooled VMOS 512-1 to the local storage 125.

In certain embodiments, the VMOS management module 310 can decide to remove an unused personalized VMOS 522-1 from the RAM disk 180. The VMOS management module 310 may be in communication with another hypervisor server 510 having another RAM disk 580. For example, the VMOS management module 310 can query that hypervisor server 510 to determine whether it has sufficient resources at both itself and its RAM disk 580 to run the personalized VM and VMOS 522-1. If the hypervisor server 510 and the RAM disk 580 have sufficient resources, the VMOS management module 310 can instruct the hypervisor server 110 to communicate with the hypervisor server 510 and migrate the personalized VMOS 522-1 to the RAM disk 580. Once the personalized VMOS 522-1 has been migrated to the hypervisor server 510, the personalized VMOS 522-1 at the RAM disk and the corresponding VM 222 at the hypervisor server 110 will be automatically removed, completing the migration.

In certain embodiments, the VMOS management module 310 may not able to find another hypervisor to migrate the personalized VMOS 522-1. In this circumstance, if the storage server 120 has a local storage 125 available, the VMOS management module 310 can instruct the RAM disk 180 to first save the personalized VMOS 522-1 to the backup VMOS data 184 of the local storage 125. Subsequently, the VMOS management module 310 instructs the hypervisor server 110 to turn off the corresponding VM 222 and instructs the RAM disk 180 to discard the personalized VMOS 522-1.

In certain embodiments, when certain preset conditions (such crisis conditions) are met or according to a set of rules, the VMOS management module 310 can execute operations to turn off VMs 222 on the hypervisor server 110 that are currently in use and discard the corresponding VMOSs in the RAM disk 180. The orders of which pooled VMOSs 512 and personalized VMOSs 522 to be discarded can be configured at the VMOS management module 310. For example, the order parameters can be set through the configuration file or the UI as discussed above.

In certain embodiments, the VMOS management module 310 can be configured to instruct the hypervisor server 110 to turn off the least used pooled VM 222 and to discard the corresponding least used pooled VMOS 512.

In certain embodiments, the VMOS management module 310 can be configured to instruct the hypervisor server 110 to turn off the least used collection of pooled VMs 222 and to discard the corresponding least used collection of pooled VMOSs 512.

In certain embodiments, the VMOS management module 310 can be configured to instruct the hypervisor server 110 to turn off the least used personalized VM 222 and to discard the corresponding least used personalized VMOS 522.

In certain embodiments, the VMOS management module 310 can be configured to instruct the hypervisor server 110 to turn off the least used collection of personalized VMs 222 and to discard the corresponding least used collection of personalized VMOSs 522.

The VMOS management module 310 can be configured to turn off the VMs 222 and the pooled VMOSs 512 and personalized VMOSs 522 in any order. For example, the VMOS management module 310 can turn off the least used pooled VMOS 512 first, then the least used collection of pooled VMOSs 512, then the least used personalized VMOS 522, and then the least used collection of personalized VMOSs 522.

The VMOS management module 310 can also instruct the hypervisor server 110 to inform a user of a VM 222 that the VM 222 is about to shut down. The user can be notified through an event log, alters, and/or emails.

In certain embodiments, particularly in a configuration where the RAM disk 180 shares the same memory device (e.g., the memory 114) with the hypervisor server 110, the VMOS management module 310 initially turns off the unused VMs 222 at the hypervisor server 110 to free memory space of the memory device. Then, the VMOS management module 310 can determine if the RAM disk 180 has enough space in the memory device. If the RAM disk 180 still does not have enough space, then the VMOS management module 310 can proceed to determine whether it can remove any personalized VMOSs 522 or pooled VMOSs 512 from the RAM disk 180.

In certain embodiments, a user of the hypervisor server 110 and storage server 120 may have a requirement that a predetermined number (e.g. 30) of VMs must always be running at the hypervisor server 110. Thus, when additional space is needed in the RAM disk 180, the VMOS management module 310 determines first if the number of the remaining VMs has reached the predetermined number. If not, the VMOS management module 310 can instruct the hypervisor server 110 to again turn off an unused VM 222. If yes, the VMOS management module 310 may proceed to remove VMOSs from the RAM disk 180. In certain embodiments, the VMOS management module 310 may choose to remove the VMOSs 512, 522 whose corresponding VMs 222 at the hypervisor server 110 have been turned off already. If no such VMOSs still exist in the RAM disk 180, then VMOS management module 310 may choose one or more operations described above to remove VMOSs 512, 522 from the RAM disk 180.

In certain embodiments, each time the VMOS management module 310 instructs the RAM disk 180 to remove a VMOS and save it to the local storage 125, the VMOS management module 310 can keep a log of all the removed VMOSs. In certain embodiments, the VMOS management module 310 can check if the occupied space in the RAM disk 180 is below a preset limit. If yes, the VMOS management module 310 can load previously removed VMOSs from the local storage 125 to the RAM disk 180. The VMOS management module 310 can load back the removed VMOSs in an order based on the time of removal. For example, the VMOS that was removed the earliest can be loaded back to the RAM disk 180 first. Or the VMOS that was removed most recently can be loaded back to the RAM disk 180 first. Alternatively, the VMOS management module 310 can load back the removed VMOSs in an order based on characteristics of users of the VMOSs such as a user title, a user role, a user authority, etc. The VMOS management module 310 can continue loading back the removed VMOSs to the RAM disk 180 until the VMOS data 182 in the RAM disk 180 have reached another predetermined limit.

In certain embodiments, each time the VMOS management module 310 instructs the hypervisor server 110 to turn off a VM, the VMOS management module 310 can keep a log of all the off VMs. In certain embodiments, the VMOS management module 310 can check if the occupied space in the memory 114 is below a preset limit. If yes, the VMOS management module 310 can turn on the VMs that was previously turned off due to memory shortage. The VMOS management module 310 can turn on the off VMs in an order based on the time of turning off. For example, the VM that was turned off the earliest can be turned on first. Or the VM that was turned off most recently can be turned on again first. Alternatively, the VMOS management module 310 can turn on the off VMs in an order based on characteristics of users of the VMs such as a user title, a user role, a user authority, etc. The VMOS management module 310 can continue turning on the off VMs until the on VMs have reached another predetermined space limit in the memory 114.

Figure 6A:
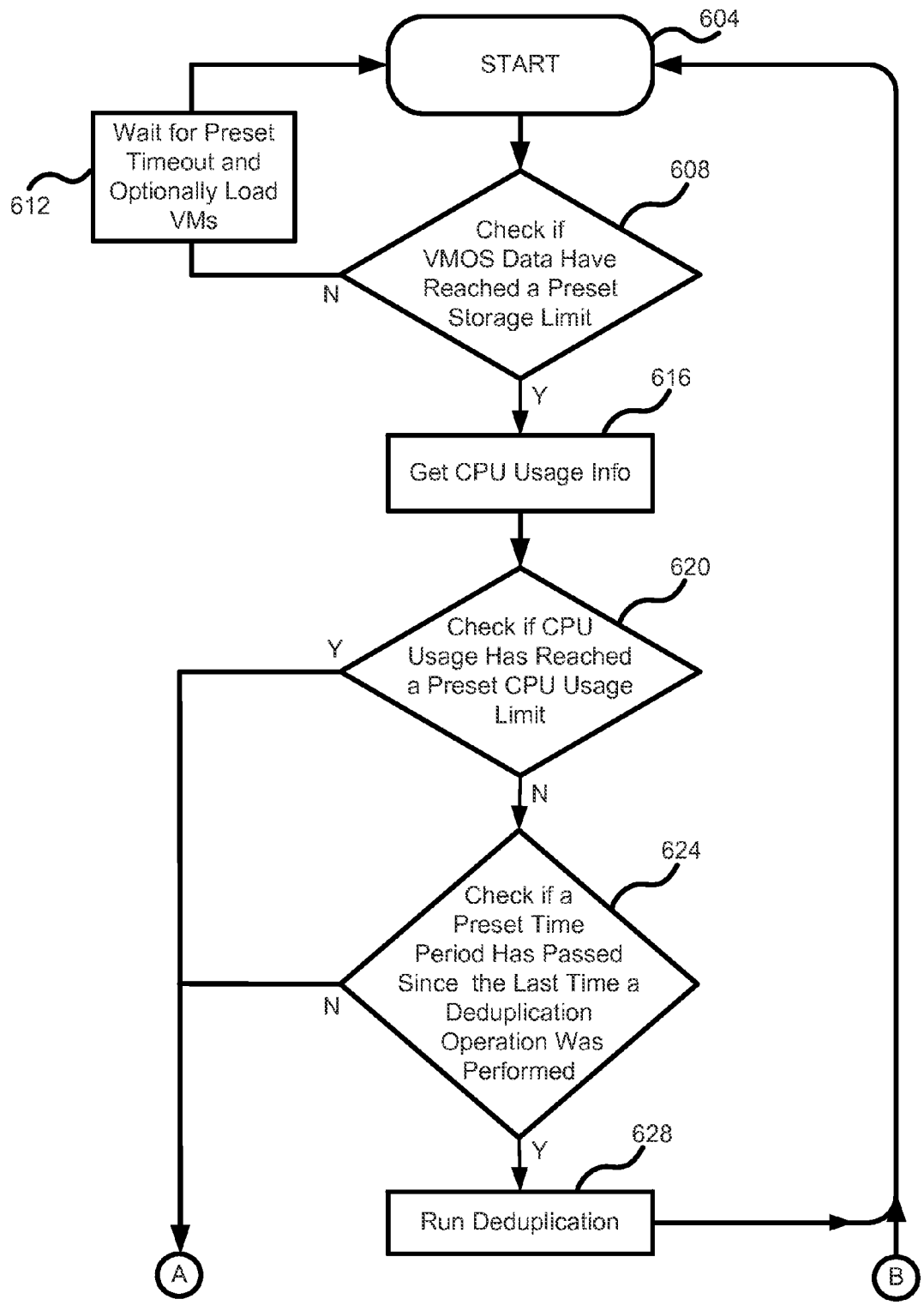
FIGS. 6A and B is a flow chart illustrating an exemplary operation process of the VMOS management module in accordance with certain embodiments of the present disclosure.
Figure 6B:
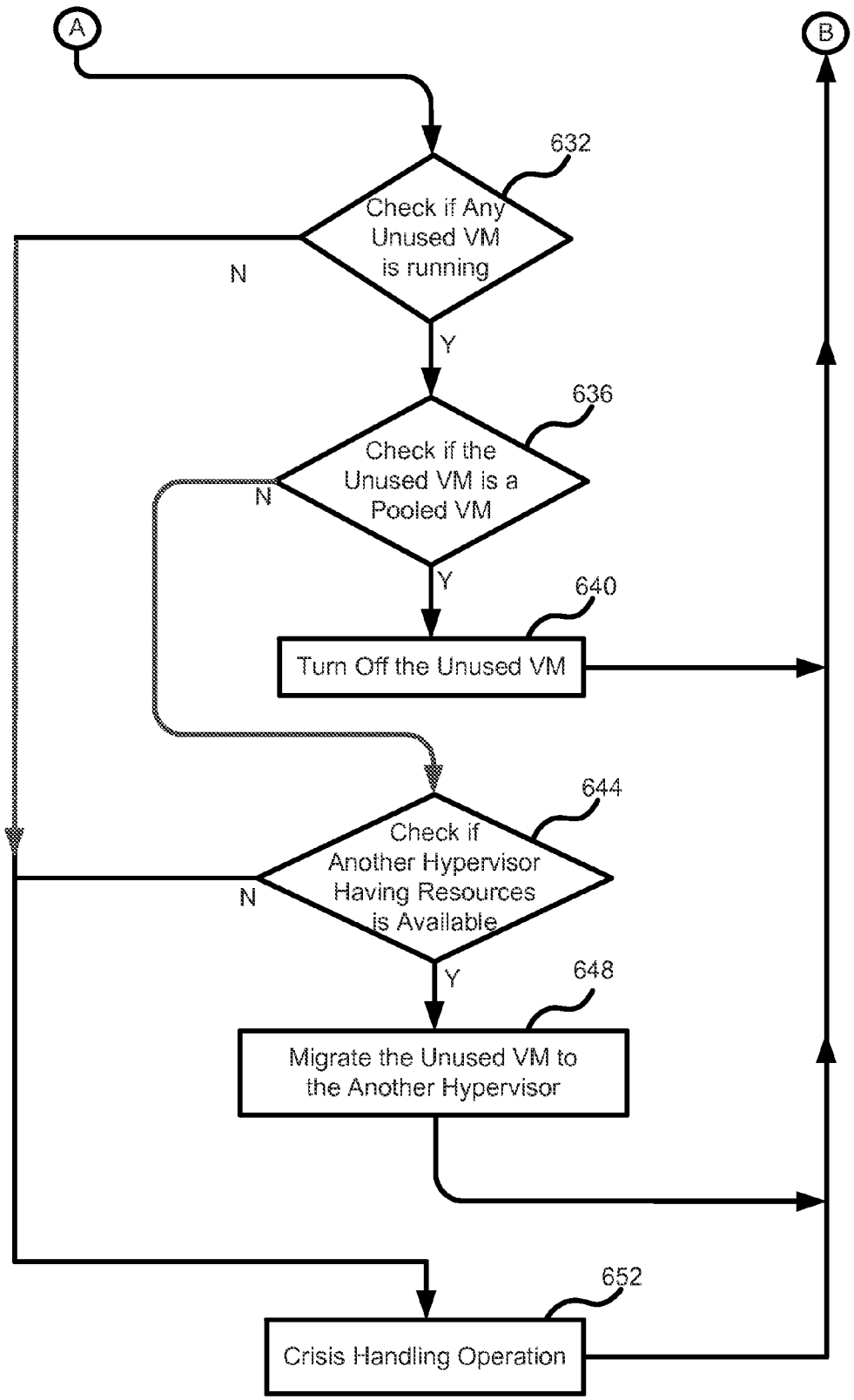

FIGS. 6A and B is a flow chart illustrating an exemplary operation process of the VMOS management module 310 in accordance with certain embodiments of the present disclosure. The VMOS management module 310 starts at operation 604. At operation 608, the VMOS management module 310 checks if the VMOS data 182 have reached a preset storage limit. For example, the VMOS management module 310 can check if the VMOS data 182 have occupied 80% of the total RAM disk 180 storage volume size. If the VMOS data 182 have not reached the preset storage limit, at operation 612, the VMOS management module 310 wait for a preset timeout (e.g., 30 minutes). After operation 612, the VMOS management module 310 enters operation 604 again.

In certain embodiments, at operation 612, during the wait time period, the VMOS management module 310 can optionally perform the operations described above to load removed VMOSs from the local storage 125 in to the RAM disk 180 and/or turn on VMs that was turned off at the hypervisor server 110. The VMOS management module 310 can perform each operation a predetermined time (e.g., three times) at predetermined time intervals (e.g., every 6 minutes), which can be configured by a user as described above. The VMOS management module 310 can be configured to ensure a predetermined time period separates the last loading operation at operation 612 and operation 608. This is to prevent operations of loading VMs/VMOSs and operations of removing VMs/VM performed subsequently from becoming cyclic in a boundary storage condition.

If at operation 608 the VMOS management module 310 determines that the VMOS data 182 have reached the preset storage limit, the VMOS management module 310 enters operation 616. At operation 616, the VMOS management module 310 obtains the usage information of the CPU 122.

At operation 620, the VMOS management module 310 checks if the usage of the CPU 122 has reached a preset CPU usage limit. For example, the CPU usage limit can be 75% of the total resource of the CPU 122. If the usage of the CPU 122 has not reached the preset CPU limit, the VMOS management module 310 enters operation 624. At operation 624, the VMOS management module 310 checks if a preset time period has passed since the last time a deduplication operation as performed. For example, the preset time period can be 30 minutes. If a preset time period has passed, the VMOS management module 310 enters operation 628. At operation 628, the VMOS management module 310 runs a deduplication operation. After operation 626, the VMOS management module 310 enters operation 604 again.

At operation 620, if the VMOS management module 310 determines that the usage of the CPU 122 has reached the preset CPU limit, the VMOS management module 310 enters operation 632. At operation 624, if the VMOS management module 310 determines that a preset time period has not passed, the VMOS management module 310 enters operation 632.

At operation 632, the VMOS management module 310 determines if any VM running on the hypervisor server 110 is not used by any user. If there is at least one VM not used by any user, then the VMOS management module 310 enters operation 636. At operation 636, the VMOS management module 310 checks if an unused VM 222 is a pooled VM. If the unused VM is a pooled VM, then the VMOS management module 310 enters operation 640. At operation 640, the VMOS management module 310 initiate a removal operation including at least one of instructing the hypervisor server 110 to turn off the unused VM 222 as well as instructing the RAM disk 180 to save the state of the corresponding pooled VMOS 512 and then discard the pooled VMOS 512 as described above. Then the VMOS management module 310 enters operation 604 again.

At operation 636, if the VMOS management module 310 determines that if the unused VM 222 is not a pooled VM (i.e., it is a personalized VM), then the VMOS management module 310 enters operation 644. At operation 644, the VMOS management module 310 determines if another hypervisor, i.e., the hypervisor server 510, has resources and is available. If yes, the VMOS management module 310 enters operation 648. At operation 648, the VMOS management module 310 instructs the hypervisor server 110 to migrate the unused VM 222 to the hypervisor server 510. After, the VMOS management module 310 enters operation 604 again.

At operation 632, if the VMOS management module 310 determines that there is no VM not used by any user, then the VMOS management module 310 enters operation 652. At operation 644, if the VMOS management module 310 determines that no other hypervisor having resources is available, the VMOS management module 310 enters operation 652.

At operation 652, the VMOS management module 310 performs crisis handling operations. For example, the VMOS management module 310 can turn off the least used pooled VMOS 512 first, then the least used collection of pooled VMOSs 512, then the least used personalized VMOS 522, and then the least used collection of personalized VMOSs 522. The VMOS management module 310 can also instruct the hypervisor server 110 to inform a user of a VM 222 that the VM 22 is about to shutdown. The user can be notified through an event log, alters, and/or emails. After, the VMOS management module 310 enters operation 604 again.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An intelligent virtual desktop infrastructure (iVDI) system, comprising:
   a first storage module having a processor, in communication with a hypervisor, and implemented by a volatile memory, wherein the first storage module supplies a plurality of virtual machine operating systems (VMOSs) to the hypervisor, wherein the hypervisor runs a plurality of virtual machine (VMs) corresponding to the plurality of VMOSs; and
   a VMOS management module configured to
      execute a first determination operation to determine if a usage of the first storage module has reached a preset storage limit,
      in response to a determination that the usage of the first storage module has reached the preset limit, selectively (a) initiate a deduplication operation directed to the plurality of VMOSs stored in the first storage module and (b) initiate a removal operation including at least one of removing at least one of the plurality of VMOSs from the first storage module and turning off at least one of the plurality of VMs running on the hypervisor by:
         executing a second determination operation to determine if a usage of the processor has reached a preset processor limit;
         in response to the second determination that the usage of the processor has reached the preset processor limit, executing a third determination operation to determine if a predetermined time period has passed since a previous deduplication operation; and
         in response to determining that the predetermined time period has not passed, initiating the removal operation;
      in the removal operation, determine if a first VM of the plurality of VMs is not used at the hypervisor, and
      in response to determining that the first VM is not used at the hypervisor,
         determine if the first VM is a pooled VM, and
         in response to a determination that the first VM is a pooled VM, store a current state of the first VM and turn off the first VM at the hypervisor.

2. The system of claim 1, wherein the VMOS management module is configured to periodically execute the first determination operation at a predetermined time interval.

3. The system of claim 1, wherein the VMOS management module is further configured to,
   in response to determining that the predetermined time period has passed, initiate the deduplication operation.

4. The system of claim 1, further comprising a second storage module in communication with the VMOS management module and implemented by a non-volatile memory, wherein the management module is configured to, in the removal operation,
   in response to determining that the first VM is not used at the hypervisor, remove a first VMOS corresponding to the first VM from the first storage module and store the first VMOS in the second storage module.

5. The system of claim 1, wherein the VMOS management module is further configured to,
   in response to a determination that the first VM is not a pooled VM, determine if another hypervisor having resources is available, and
   in response to a determination that the another hypervisor is available, migrate the first VM to the another hypervisor, and otherwise, store a current state of the first VM and turns off the first VM.

6. The system of claim 1, wherein the VMOS management module is further configured to, in the removal operation,
   select at least one second VM of the plurality of VMs in accordance with a predetermined set of rules, and selectively turn off the at least one second VM and remove a VMOS corresponding to the at least one second VM from the first storage module.

7. The system of claim 6, wherein the VMOS management module is configured to select the at least one second VM from pooled VMs of the plurality of VMs based on a usage comparison of the pooled VMs and notify at least one user of the at least one second VM unavailability of the at least one second VM.

8. The system of claim 7, wherein the at least one second VM is a collection of pooled VMs.

9. The system of claim 6, wherein the VMOS management module is configured to select the at least one second VM from personalized VMs of the plurality of VMs based on a usage comparison of the personalized VMs and notify at least one user of the at least one second VM unavailability of the second VMOS.

10. The system of claim 9, wherein the at least one second VM is a collection of personalized VMs.

11. A method for use with an intelligent virtual desktop infrastructure (iVDI) system including a first storage module having a processor, in communication with a hypervisor, and implemented by a volatile memory, wherein the first storage module supplies a plurality of virtual machine operating systems (VMOSs) to the hypervisor, wherein the hypervisor runs a plurality of virtual machine (VMs) corresponding to the plurality of VMOSs, the method comprising:
executing, at a VMOS management module, a first determination operation to determine if a usage of the first storage module has reached a preset storage limit; and
in response to a determination that the usage of the first storage module has reached the preset limit, selectively (a) initiating a deduplication operation directed to the plurality of VMOSs stored in the first storage module and (b) initiating a removal operation including at least one of removing at least one of the plurality of VMOSs from the first storage module and turning off at least one of the plurality of VMs running on the hypervisor by:
executing, at the VMOS management module, a second determination operation to determine if a usage of the processor has reached a preset processor limit;
in response to the second determination that the usage of the processor has reached a preset processor limit, executing, at the VMOS management module, a third determination operation to determine if a predetermined time period has passed since a previous deduplication operation; and
in response to determining that the predetermined time period has not passed, initiating the removal operation;
wherein the removal operation comprises:
determining, at the VMOS management module, if a first VM of the plurality of VMs is not used at the hypervisor; and
in response to determining that the first VM is not used at the hypervisor,
determining if the first VM is a pooled VM, and
in response to a determination that the first VM is a pooled VM, storing a current state of the first VM and turn off the first VM at the hypervisor.

12. The method of claim 11, further comprising:
periodically executing, at the VMOS management module, the first determination operation at a predetermined time interval.

13. The method of claim 11, further comprising:
in response to determining that the predetermined time period has passed, initiating the deduplication operation.

14. The method of claim 11, further comprising:
in response to determining that the first VM is not used at the hypervisor, selectively removing a VMOS corresponding to the first VM from the first storage module.

15. The method of claim 14, further comprising:
in response to a determination that the first VM is not a pooled VM, determining if another hypervisor having resources is available; and
in response to a determination that the another hypervisor is available, migrating the first VM to the another hypervisor; otherwise, storing a current state of the first VM and turns off the first VM.

16. The method of claim 11, wherein the removal operation further comprises:
selecting at least one second VM of the plurality of VMs in accordance with a predetermined set of rules; and
selectively turning off the at least one second VM and removing a VMOS corresponding to the at least one second VM from the first storage module.

17. The method of claim 16, further comprising: selecting the at least one second VM from pooled VMs of the plurality of VMs based on a usage comparison of the pooled VMs and notifying at least one user of the at least one second VM unavailability of the at least one second VM.

18. The method of claim 17, wherein the at least one second VM is a collection of pooled VMs.

19. The method of claim 16, further comprising: selecting the at least one second VM from personalized VMs of the plurality of VMs based on a usage comparison of the personalized VMs and notify at least one user of the at least one second VM unavailability of the second VMOS.

20. The method of claim 19, wherein the at least one second VM is a collection of personalized VMs.

21. A non-transitory computer readable medium storing computer executable instructions for use with an intelligent virtual desktop infrastructure (iVDI) system including a first storage module having a processor, in communication with a hypervisor, and implemented by a volatile memory, wherein the first storage module supplies a plurality of virtual machine operating systems (VMOSs) to the hypervisor, wherein the hypervisor runs a plurality of virtual machine (VMs) corresponding to the plurality of VMOSs, the instructions comprising:
executing, at a VMOS management module, a first determination operation to determine if a usage of the first storage module has reached a preset storage limit;
in response to a determination that the usage of the first storage module has reached the preset limit, selectively (a) initiating a deduplication operation directed to the plurality of VMOSs stored in the first storage module and (b) initiating a removal operation including at least one of removing at least one of the plurality of VMOSs from the first storage module and turning off at least one of the plurality of VMs running on the hypervisor by:
executing, at the VMOS management module, a second determination operation to determine if a usage of the processor has reached a preset processor limit;
in response to the second determination that the usage of the processor has reached a preset processor limit, executing, at the VMOS management module, a third determination operation to determine if a predetermined time period has passed since a previous deduplication operation; and in response to determining that the predetermined time period has not passed, initiating the removal operation;

in the removal operation, determining, at the VMOS management module, if a first VM of the plurality of VMs is not used at the hypervisor; and in response to determining that the first VM is not used at the hypervisor, determining if the first VM is a pooled VM, and in response to a determination that the first VM is a pooled VM, storing a current state of the first VM and turn off the first VM at the hypervisor.

22. The non-transitory computer readable medium of claim 21, wherein the instructions further comprise:

periodically executing, at the VMOS management module, the first determination operation at a predetermined time interval.

23. The non-transitory computer readable medium of claim 21, wherein the instructions further comprise:

in response to determining that the predetermined time period has passed, initiating the deduplication operation.

24. The non-transitory computer readable medium of claim 21, wherein the instructions further comprise:

in response to determining that the first VM is not used at the hypervisor, selectively removing a VMOS corresponding to the first VM from the first storage module.

25. The non-transitory computer readable medium of claim 21, wherein the instructions further comprise:

in response to a determination that the first VM is not a pooled VM, determining if another hypervisor having resources is available; and in response to a determination that the another hypervisor is available, migrating the first VM to the another hypervisor; otherwise, storing a current state of the first VM and turns off the first VM.

26. The non-transitory computer readable medium of claim 21, wherein the instructions further comprise:

selecting at least one second VM of the plurality of VMs in accordance with a predetermined set of rules; and turning off the at least one second VM and selectively removing a VMOS corresponding to the at least one second VM from the first storage module.

27. The non-transitory computer readable medium of claim 26, wherein the instructions further comprise: selecting the at least one second VM from pooled VMs of the plurality of VMs based on a usage comparison of the pooled VMs and notifying at least one user of the at least one second VM unavailability of the at least one second VM.

28. The non-transitory computer readable medium of claim 27, wherein the at least one second VM is a collection of pooled VMs.

29. The non-transitory computer readable medium of claim 26, wherein the instructions further comprise: selecting the at least one second VM from personalized VMs of the plurality of VMs based on a usage comparison of the personalized VMs and notify at least one user of the at least one second VM unavailability of the second VMOS.

30. The non-transitory computer readable medium of claim 29, wherein the at least one second VM is a collection of personalized VMs.

* * * * *